May 19, 1964     R. E. BONNET     3,133,738
PRESSURE SEAL
Filed Dec. 12, 1961
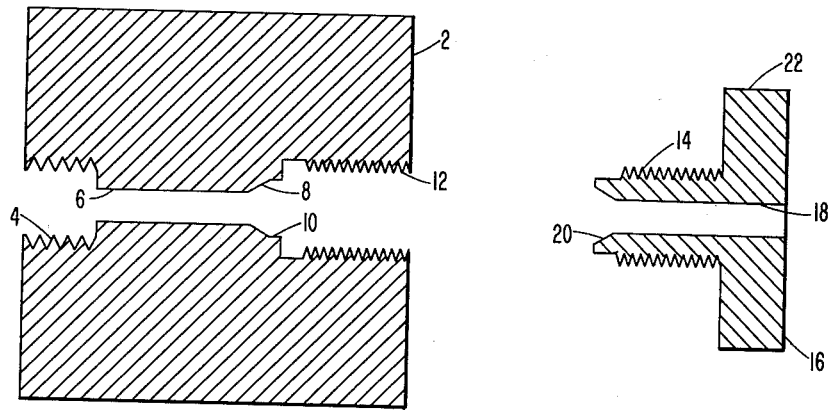
FIG. 1
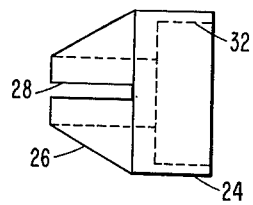
FIG. 2
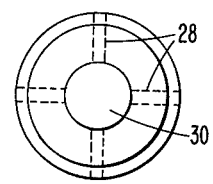
FIG. 3
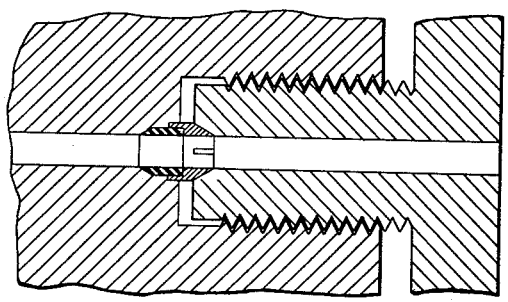
FIG. 4
FIG. 5
INVENTOR
ROBERT E. BONNET
BY
ATTORNEY

United States Patent Office 3,133,738
Patented May 19, 1964

3,133,738
PRESSURE SEAL
Robert Edwin Bonnet, New Providence, N.J., assignor to Engelhard Industries, Inc., Newark, N.J., a corporation of Delaware
Filed Dec. 12, 1961, Ser. No. 158,656
1 Claim. (Cl. 277—112)

This invention relates to a pressure seal fitting which may be used to seal tubing, wire, rods and the like having small diameters. For example, the pressure seal of the invention may be used to seal tubes, wire, rods and the like having a diameter as small as 0.003 inch. Of course, the pressure seal of the invention may be used to seal such articles having any diameter larger than this.

Among the pressure fittings presently available is one type using a hardened ferrule swaged down over a soft metal tube in which a seal is made by distortion. These fittings are not suitable for use with tube sizes much below 1/16 inch in diameter or with fragile tubing such as ceramic tubing or in leak testing work, for example, using palladium diffusion tubes where it is desired, after finding the tubing to be free from leakage, to have it in an undeformed condition. It is a further disadvantage that these ferrules are not reusable. In order to reuse the fitting or tubing, the old ferrule must be cut off and a new ferrule inserted. In fittings of this type, the allowable tolerance on the O.D. of the tubing to be used is very small, percentage-wise.

Another example of leak testing is for sheaths of integrally sheathed thermocouple wires. The thermocouple may consist, for example, of chromel-alumel, or of precious metal couple wires covered with a ceramic material and placed in a precious metal sheath. Particularly in the case of the precious metal thermocouples, the couples may be of sufficiently small size that the conventional pressure seals will not hold them. In testing such thermocouples, another method involving silver soldered joints has been employed. Where such silver solder seals are used, it is necessary to cut off the portions of such sheathed tubes containing the silver solder and recover the metal in these parts.

The present invention was designed with the object of affording an improved method of pressure sealing any type of cylindrically walled object, and particularly sealing a thin walled object without distortion even under high pressures. The design has advantages over the prior art in providing a combination assembly of a strong centrally bored pressure resisting bushing, the function of which is to clamp and hold the object, and a softer bushing which makes the actual seal. This combination of the strong and softer parts makes possible a seal against high pressure without leaking or blowing out of the seal.

The pressure seal of the present invention, while capable of sealing elements of very small diameters as noted above, in addition, will seal small diameter tubes without deformation thereof. The pressure seal can be used to seal almost any material such as metals, glass, ceramics, carbides and the like. The pressure seal of this invention can easily be assembled and disassembled, its parts are reusable and within limits it is adjustable for different size tubing. If it is desired to seal different size articles in one specific pressure seal unit it is necessary only to replace the sealing gland with a gland bored to the diameter of the material to be sealed. It is evident that this is only practical within certain ranges. The ranges for specific pressure seals may vary 10% from a given dimension for which the seal is designed. Within a reasonable range, different size tubing may be used with the same gland. If it is desired to substitute a different article of the same diameter, there is no need to replace the gland. The fitting can be loosened, the article removed and another inserted. To assemble or disassemble the sealing gland requires no tools as the device may be tightened merely by hand.

Referring to the accompanying drawings, one embodiment of the device of the present invention is shown in which FIGURE 1 is a view in section through the main body portion of the pressure seal and through the jam nut used in association therewith, FIGURE 2 is an enlarged side view of a centrally-bored bushing which abuts against the jam nut shown in FIGURE 1, FIGURE 3 is an end view of the bushing shown in FIGURE 2, FIGURE 4 is an enlarged side view of an easily deformable second bushing which seats in the bushing shown in FIGURES 2 and 3, and FIGURE 5 is a view showing the parts of FIGURES 1, 2, 3 and 4 assembled.

Referring to FIGURE 1 of the drawings, the seal consists of a main body portion 2 having an internally threaded bore 4 in one end thereof to which a source of pressure may be connected. A central bore 6 extends completely through the main body portion 2 and, at the end opposite of the internally threaded bore 4, is a taper or conical shoulder 8 which is joined by a counterbore 10, counterbore 10 being of slightly larger diameter than the central bore 6. The central bore 6 connects with an enlarged internally threaded counterbore 12 which receives the external threads 14 on the jam nut 16. The jam nut 16 has a bore 18 passing completely therethrough and in the threaded end of the jam nut is a taper or bevel 20. Both the taper 8 in the main body portion 2 and the taper 20 in the jam nut 16 may be at an included angle of about 60°. The jam nut 16 is knurled on the periphery 22 thereof in order to facilitate turning down the jam nut by hand. Both the main body portion 2 and the jam nut 16 may be made of any suitable material and brass has been found to give good results. The material of construction will, of course, vary upon the application to which the device is subjected.

Referring to FIGURES 2 and 3, a bushing is shown having a cylindrical portion 24 and a conical portion 26, the conical portion being provided with a plurality of slots 28. The bushing is also provided with a central bore 30 and has, in the interior thereof, a counterbore 32 to accept the bushing shown in FIGURE 4.

The easily deformable bushing shown in FIGURE 4 has a cylindrical portion 34, of an appropriate diameter to press fit into the counterbore 32 of the bushing of FIGURE 2, and a conical portion 36. The bushing is also provided with a central bore 38 therethrough.

The bushing shown in FIGURES 2 and 3 may be made of any suitable hard material such as stainless steel, for example, while the easily deformable bushing shown in FIGURE 4 is made of a material such as hard rubber, neoprene, polytetrafluoroethylene, nylon, soft copper, gold or other soft precious metals and the like.

In using the pressure seal of the invention, the rod, tube, wire or other element to be sealed is inserted through the central bore 18 in the jam nut 16. The sealing gland parts, as shown in FIGURES 2 and 3, are then assembled as in FIGURE 5 by pressing the easily deformable bushing, FIGURE 4, into the counterbore 32 of the bushing in FIGURE 2, with the tapered ends extending outwardly as shown in FIGURE 5. The assembled sealing gland is then slipped over the element to be sealed with the conical portion 26 thereof abutting against the conical shoulder or taper 20 in the jam nut 16. It is advisable for the end of the element to be sealed to extend through the bore 38 in the easily deformable bushing 34.

The jam nut, gland, and element to be sealed are then inserted through the threaded bore 12 of the main body portion 2 and, as the jam nut is threadably engaged and turned down, the conical portion 36 in the easily deformable bushing abuts against the conical shoulder 8 in the main body portion 2. As pressure is applied by continuing to advance the jam nut 16, a tight seal is made between the deformable bushing and the element to be sealed.

Similarly, the element sealed is maintained in position by the first bushing, shown in FIGURE 2. As the jam nut is tightened, the slots 28 in the tapered portion of the first bushing shown in FIGURE 2 act as a collet and clamp the outer circumference of the material being sealed thereby tightly locking it and preventing it from being blown out by the pressure. Of course, the amount of pressure exerted by the jam nut 16 determines the pressure which the seal assembly will withstand.

The pressure seal of the invention has been used to make helium leak checks up to 2300 p.s.i.g. and has withstood hydrostatic pressure tests of 12,000 p.s.i.g. Slight variations in the overall pressure seal assembly, such as the number of threads per inch on the jam nut 16 and the surface areas of contact between the jam nut, the bushings and the main body portion 2, will vary either upwardly or downwardly the maximum pressure limitations of the pressure seal assembly.

The pressure seal of the invention, in addition to the uses listed above, may also be used for holding rods in position, thermocouple seals and electrical seals.

It will be obvious to those skilled in the art that many modifications may be made within the scope of the present invention without departing from the spirit thereof, and the invention includes all such modifications.

What is claimed is:

A pressure seal comprising a body having a bore therethrough adapted to receive an element to be sealed, means at one end of the bore for connection to a pressure source, a taper at the other end of the bore and an internally threaded counterbore, a centrally-bored tapered first bushing having a counterbore in one end and the tapered end thereof having longitudinal slots therein, a centrally-bored tapered second bushing of easily deformable material seated in the counterbore of the first bushing with the tapered portion bearing against the taper in the body bore and a centrally bored externally threaded jam nut having a taper at one end of the bore therein seated against the tapered end of the first bushing whereby said tapered end of the first bushing will clamp the outer circumference of the element to be sealed when said jam nut is tightened.

References Cited in the file of this patent

UNITED STATES PATENTS

| | | |
|---|---|---|
| 1,869,915 | Sample | Aug. 2, 1932 |
| 2,318,575 | Armington et al. | May 11, 1943 |
| 2,477,172 | Brownlow | July 26, 1949 |
| 3,004,783 | Webb | Oct. 17, 1961 |

FOREIGN PATENTS

| | | |
|---|---|---|
| 13,865 | Great Britain | Feb. 4, 1904 |